(12) United States Patent
Holt et al.

(10) Patent No.: US 10,866,745 B2
(45) Date of Patent: Dec. 15, 2020

(54) METHODS AND SYSTEMS FOR IMPROVED AUTOMATED FILE SYSTEM CAPACITY RISK ANALYSIS

(71) Applicant: JPMorgan Chase Bank, N.A., New York, NY (US)

(72) Inventors: J. Chris Holt, New Port Richey, FL (US); Noahal Mundt, Wesley Chapel, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/450,662

(22) Filed: Jun. 24, 2019

(65) Prior Publication Data

US 2019/0391749 A1 Dec. 26, 2019

Related U.S. Application Data

(60) Provisional application No. 62/689,576, filed on Jun. 25, 2018.

(51) Int. Cl.
*G06F 12/00* (2006.01)
*G06F 3/06* (2006.01)
*G06F 17/18* (2006.01)

(52) U.S. Cl.
CPC .......... *G06F 3/0619* (2013.01); *G06F 3/0629* (2013.01); *G06F 3/0673* (2013.01); *G06F 17/18* (2013.01)

(58) Field of Classification Search
CPC .... G06F 3/0619; G06F 3/0629; G06F 3/0673; G06F 17/18
See application file for complete search history.

(56) References Cited

U.S. PATENT DOCUMENTS 9,811,261 B1 * 11/2017 Ramani ................. G06F 3/0631

* cited by examiner

*Primary Examiner* — Shawn X Gu
(74) *Attorney, Agent, or Firm* — Greenblum & Bernstein, P.L.C.

(57) ABSTRACT

Systems and methods for automated file system capacity risk analysis include obtaining first utilization data of the file system during a plurality of series of time intervals, projecting a future utilization value for the series of time intervals, and determining a threshold utilization percentage indicative of a risk of reaching maximum capacity of the file system. In response to the projected future utilization value being equal to or greater than the threshold, calculating a rate of change of the first utilization data for each of the series of time intervals, determining a variation of the rates of change of all the series of time intervals, and in response to the variation of the rates of change being positive or the first utilization data for the last time interval being equal to or greater than the threshold, designating the file system as being at risk of reaching maximum capacity.

20 Claims, 5 Drawing Sheets

METHODS AND SYSTEMS FOR IMPROVED AUTOMATED FILE SYSTEM CAPACITY RISK ANALYSIS

PRIORITY TO RELATED APPLICATION

This application claims priority to U.S. Provisional Application No. 62/689,576, filed on Jun. 25, 2018, the contents of which being incorporated herein by reference in their entirety.

BACKGROUND

1. Field of the Disclosure

This technology generally relates to methods and systems for accurately predicting the risk of reaching maximum capacity of a file system, and more particularly to automatically analyzing the risk of reaching maximum capacity of a file system while substantially avoiding false positives.

2. Background Information

Computer memory users such as, e.g., individuals or enterprises, typically manage infrastructure for data storage including servers hosting file systems, such as logical partitions on a memory or hard drive. As part of the infrastructure management, file system capacity is typically monitored to determine whether current utilization of a file system represents a risk of reaching the maximum allowed capacity for that file system. The fact that a file system reaches maximum capacity may have a negative impact on processes and users of the file system, and typically requires action by an administrator, such as upgrading and/or providing additional storage, which causes unnecessary system or memory updates and results in additional costs. Current methods for file system capacity risk analysis typically include performing a linear regression analysis, which entails a certain percentage of false positives, particularly when, e.g., increased utilization occurs in early weeks but remains substantially unchanged, or drops, in later weeks.

SUMMARY

The present disclosure, through one or more of its various aspects, embodiments, and/or specific features or sub-components, provides, inter alia, various systems, servers, devices, methods, media, programs, and platforms for automated file system capacity risk analysis. For example, the various aspects, embodiments, features, and/or sub-components provide systems and methods for accurately and automatically analyzing the risk of reaching maximum capacity of a file system while substantially avoiding false positives.

According to an aspect of the present disclosure, a method for performing automated file system capacity risk analysis is provided. The method is implemented by a processor on a computing device. The method includes: obtaining, by the processor, first utilization data of the file system during a plurality of series of time intervals, the plurality of series of time intervals including a last series of time intervals, the last series of time intervals including a last time interval and a second-to-last time interval; projecting, by the processor, a future utilization value for at least one of the plurality of series of time intervals by performing a linear regression on the first utilization data; setting, by the processor, a threshold utilization percentage indicative of a risk of reaching maximum capacity of the file system; and determining, by the processor, whether the projected future utilization value is equal to or greater than the threshold utilization percentage. In example embodiments, the method further includes setting, by the processor, a designated number of time periods.

In example embodiments, in response to the projected future utilization value being equal to or greater than the threshold utilization percentage, for example within the designated number of time periods, the method further includes calculating, by the processor, a rate of change of the first utilization data for each of the series of time intervals; determining, by the processor, a variation of the rates of change of all the series of time intervals; and in response to at least one of the variation of the rates of change of all the series of time intervals being positive and the first utilization data for the last time interval being equal to or greater than the threshold, designating, by the processor, the file system as being at risk of reaching maximum capacity.

According to another aspect of the present disclosure, a computing device configured to implement an execution of a method for performing automated file system capacity risk analysis is provided. The computing device includes a display screen, a processor, a memory, and a communication interface coupled to each of the processor, the memory, and the display screen. When the method is executed, the processor is configured to: obtain first utilization data of the file system during a plurality of series of time intervals, the plurality of series of time intervals including a last series of time intervals, the last series of time intervals including a last time interval and a second-to-last time interval; project a future utilization value for at least one of the plurality of series of time intervals by performing a linear regression on the first utilization data; set a threshold utilization percentage indicative of a risk of reaching maximum capacity of the file system; and determine whether the projected future utilization value is equal to or greater than the threshold utilization percentage. In example embodiments, the processor is further configured to set a designated number of time periods.

In example embodiments, in response to the projected future utilization value being equal to or greater than the threshold utilization percentage, for example within the designated number of time periods, the processor is configured to calculate a rate of change of the first utilization data for each of the series of time intervals, and determine a variation of the rates of change of all the series of time intervals. In example embodiments, in response to at least one of the variation of the rates of change of all the series of time intervals being positive and the first utilization data for the last time interval being equal to or greater than the threshold, designate the file system as being at risk of reaching maximum capacity.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
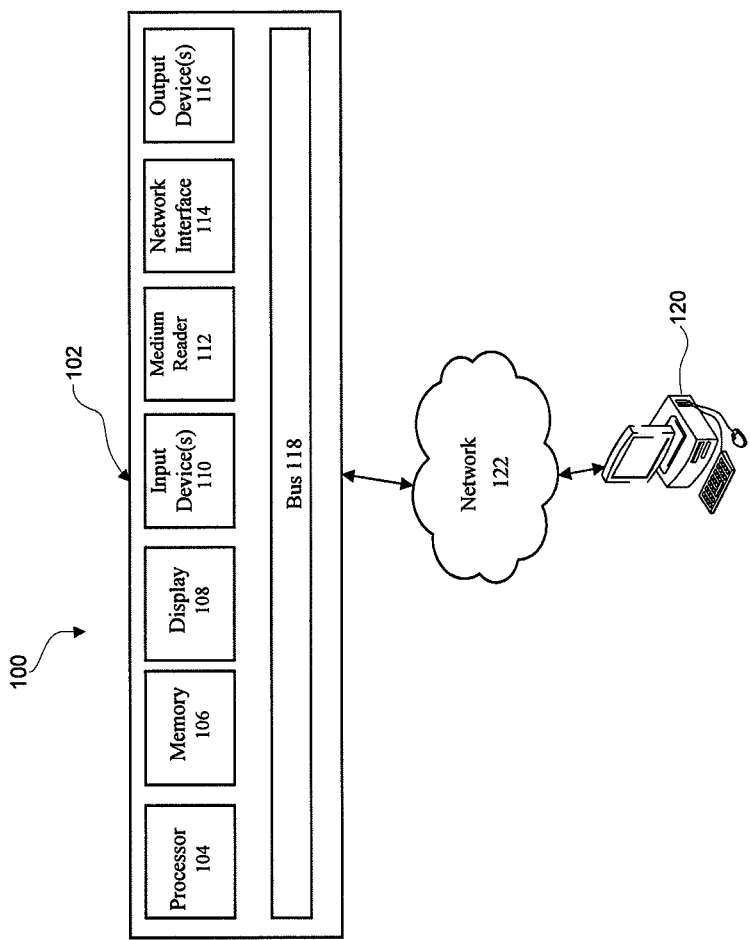
FIG. 1 illustrates a computer system for implementing automated file system capacity risk analysis, according to an example embodiment.

FIG. 1 illustrates a computer system for implementing automated file system capacity risk analysis, according to an example embodiment. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 2:
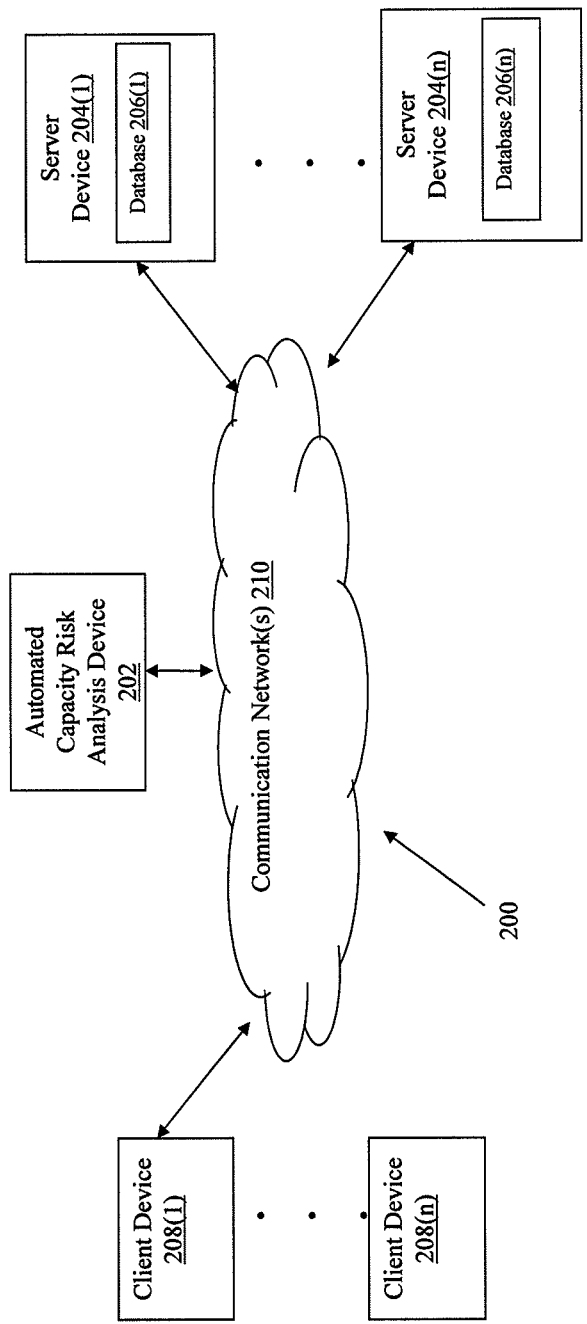
FIG. 2 illustrates a diagram of a network environment for automated file system capacity risk analysis, according to an example embodiment.

FIG. 2 illustrates a diagram of a network environment for automated file system capacity risk analysis, according to an example embodiment. In an exemplary embodiment, the capacity risk analysis framework is executable on any networked computer platform, such as, for example, a wireless mobile communication device, i.e., a smart phone.

The ACRA device 202 may be the same or similar to the computer system 102 as described with respect to FIG. 1. The ACRA device 202 may store one or more applications that can include executable instructions that, when executed by the ACRA device 202, cause the ACRA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ACRA device 202 itself, may be located in virtual server(s) running in a cloud-based computing environment rather than being tied to one or more specific physical network computing devices. Also, the application(s) may be running in one or more virtual machines (VMs) executing on the ACRA device 202. Additionally, in one or more embodiments of this technology, virtual machine(s) running on the ACRA device 202 may be managed or supervised by a hypervisor.

In the network environment 200 of FIG. 2, the ACRA device 202 is coupled to a plurality of server devices 204(1)-204(n) that hosts a plurality of databases 206(1)-206(n), and also to a plurality of client devices 208(1)-208(n) via communication network(s) 210. A communication interface of the ACRA device 202, such as the network interface 114 of the computer system 102 of FIG. 1, operatively couples and communicates between the ACRA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ACRA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ACRA devices that efficiently automatically enable and disable a purchase card for attempted transactions.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ACRA device 202 may be a standalone device or integrated with one or more other devices or apparatuses, such as one or more of the server devices 204(1)-204(n), for example. In one particular example, the ACRA device 202 may include or be hosted by one of the server devices 204(1)-204(n), and other arrangements are also possible. Moreover, one or more of the devices of the ACRA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ACRA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store utilization data, time interval data, and data that relates to the capacity risk analysis framework.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ACRA device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ACRA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ACRA device 202, the server devices 204(1)-204(n), or the client devices 208(1)-208(n), for example, may be configured to operate as virtual instances on the same physical machine. In other words, one or more of the ACRA device 202, the server devices 204(1)-204(n), or the client devices 208(1)-208(n) may operate on the same physical device rather than as separate devices communicating through communication network(s) 210. Additionally, there may be more or fewer ACRA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
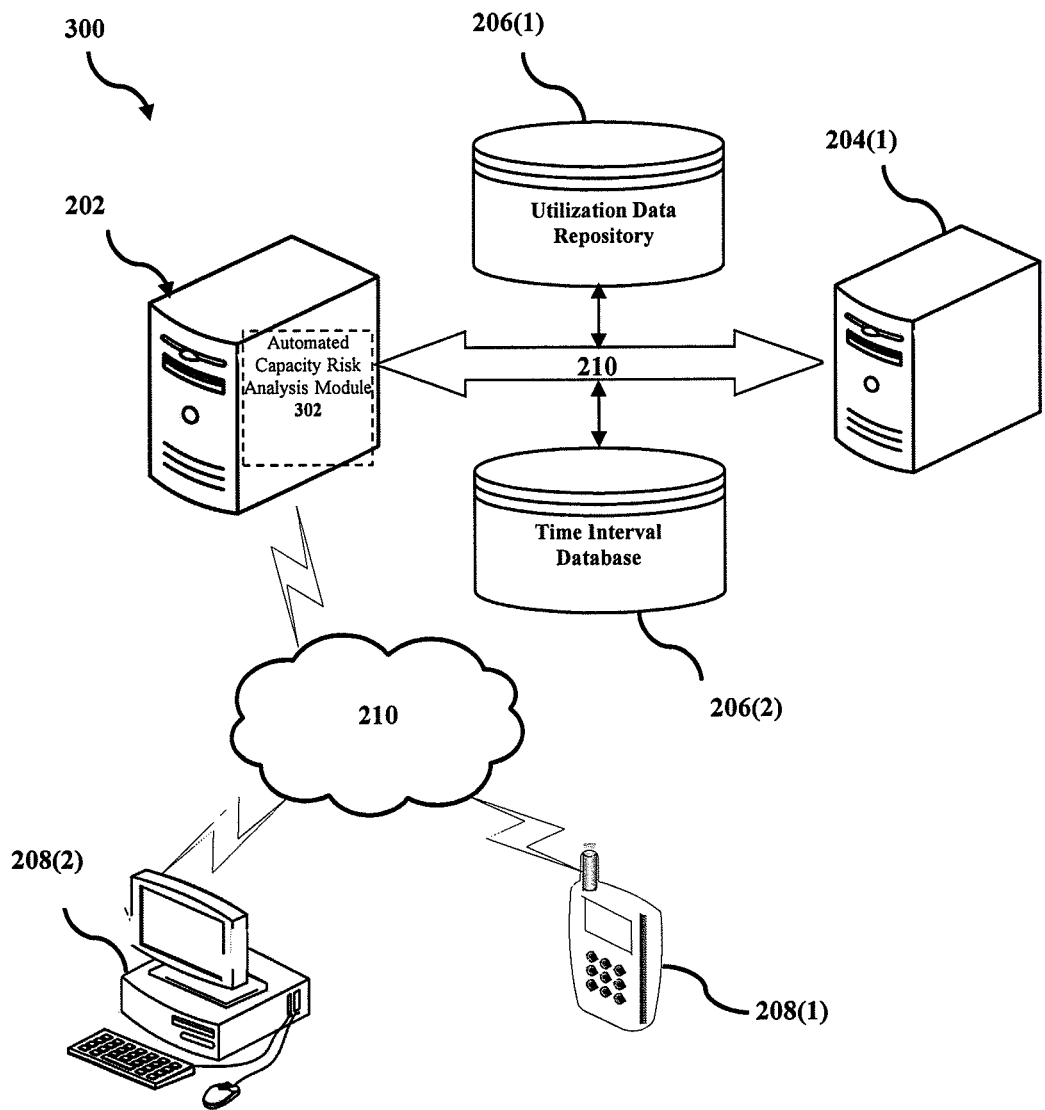
FIG. 3 shows a system for implementing an automated file system capacity risk analysis, according to an example embodiment.

FIG. 3 shows a system for implementing an automated file system capacity risk analysis, according to an example embodiment. The ACRA device 202 is described and shown in FIG. 3 as including an automated capacity risk analysis module 302, although it may include other rules, policies, modules, databases, or applications, for example. As will be described below, the automated capacity risk analysis module 302 is configured to analyze the capacity risk of a file system in an automated, efficient, scalable, and reliable manner.

An exemplary process 300 for implementing a capacity risk analysis framework for a file system by utilizing the network environment of FIG. 2 is shown as being executed in FIG. 3. Specifically, a first client device 208(1) and a second client device 208(2) are illustrated as being in communication with ACRA device 202. In this regard, the first client device 208(1) and the second client device 208(2) may be "clients" of the ACRA device 202 and are described herein as such. Nevertheless, it is to be known and understood that the first client device 208(1) and/or the second client device 208(2) need not necessarily be "clients" of the ACRA device 202, or any entity described in association therewith herein. Any additional or alternative relationship may exist between either or both of the first client device 208(1) and the second client device 208(2) and the ACRA device 202, or no relationship may exist.

Further, ACRA device 202 is illustrated as being able to access a utilization data repository 206(1) and time interval database 206(2). The automated capacity risk analysis module 302 may be configured to access these databases for implementing a capacity risk analysis framework for a file system.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ACRA device 202 via broadband or cellular communication. Of course, these embodiments are merely exemplary and are not limiting or exhaustive.

Upon being started, the automated capacity risk analysis module 302 executes a process for automated capacity risk analysis. An exemplary process for implementing automated capacity risk analysis is generally indicated at flowchart 400 in FIG. 4.

Figure 4:
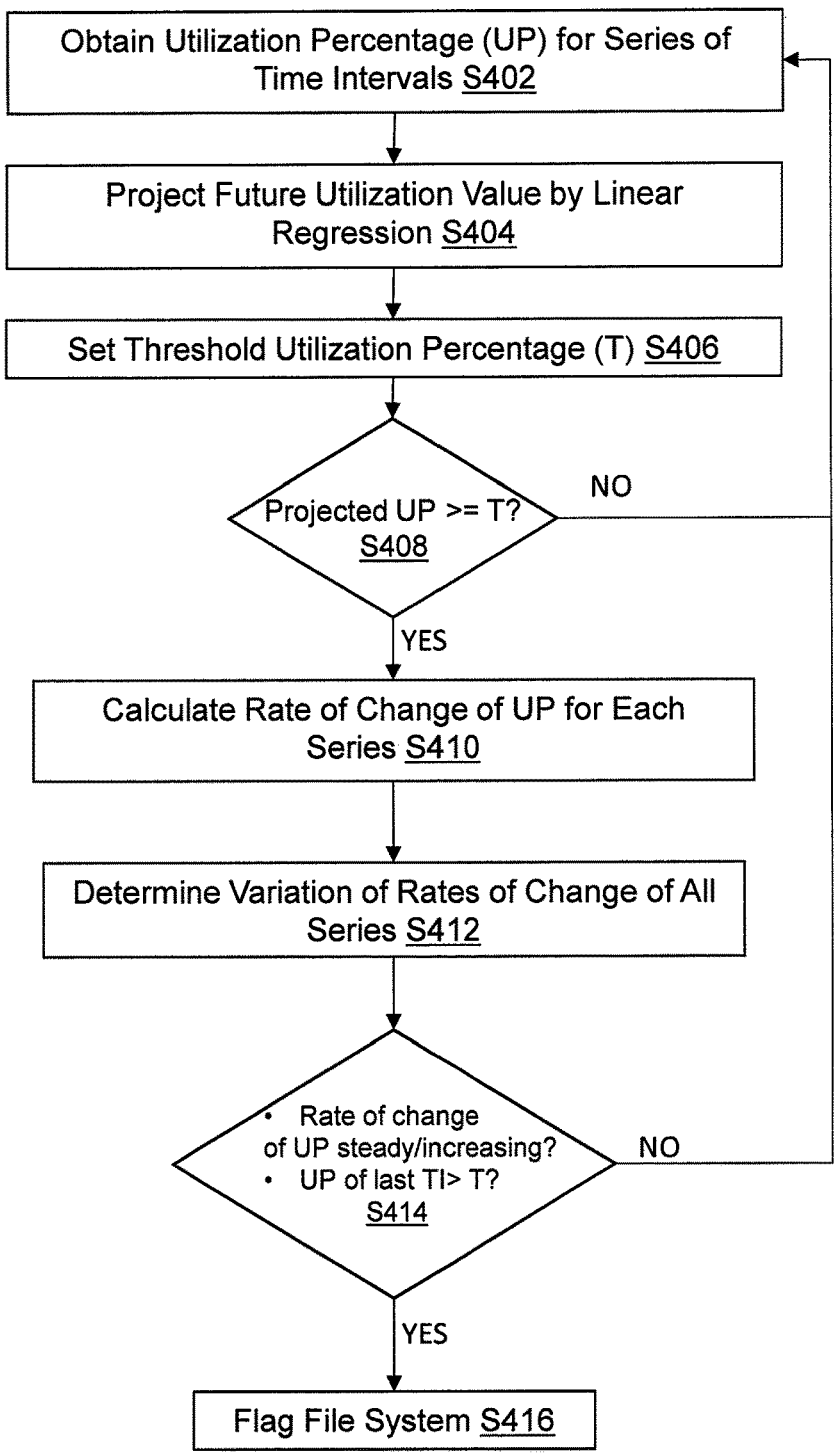
FIG. 4 is a flowchart of a process for performing automated file system capacity risk analysis, according to an example embodiment.

FIG. 4 is a flowchart of a process for performing automated file system capacity risk analysis, according to an example embodiment. In the process 400 of FIG. 4, at step S402, the automated capacity risk analysis module 302 obtains the utilization data of the file system for each of a plurality of series of time intervals. In example embodiments, the utilization data of a file system may refer to a utilization percentage of that file system with respect to its maximum capacity. For example, the utilization data of the file system may refer to the utilization percentage of the total memory of the file system. In example embodiments, one or more of the series of time intervals have 12 time intervals. However, the series of time intervals may include different numbers of time intervals. For example, the series of time intervals may include 4, 6, 8, 10, 14, 16, 18 or other time intervals. In example embodiments, the time intervals are one-week time intervals. Accordingly, for a series including 12 time intervals, the series extends over 12 weeks.

In example embodiments, the utilization percentage of a file system for a given time interval, e.g., a one-week time interval, is the maximum utilization percentage of that file system during that week, even if the utilization percentage falls below that maximum amount during other periods of time within that same week. In example embodiments, the series of time intervals are offset with respect to each other. For example, two successive series of time intervals are offset with respect to each other by one time interval, e.g., one week. Accordingly, if a first series starts at Week 1, then the series immediately following the first series starts at Week 2. In other example embodiments, two successive series of time intervals are offset with respect to each other by more than one time interval, e.g., more than one week. Accordingly, if a first series starts at Week 1, then the series immediately following the first series may start at Week 4. In example embodiments, within each series, the time intervals are ranked successively. For example, if a time interval is a week, then Week 2 is immediately successive to Week 1, and Week 10 is immediately successive to Week 9.

At step S404, the automated capacity risk analysis module 302 projects the future value of the utilization percentage ("UP") of the file system by performing a linear regression analysis over a period of time encompassing an entire series of time intervals. In example embodiments, the automated capacity risk analysis module 302 projects the future UP of the file system for a time interval that is subsequent to the last time interval of that series. In example embodiments, at S404, the automated capacity risk analysis module 302 projects the future UP at one or more weeks subsequent to Week 12. For example, if the series of time intervals is a series of 12 weeks, then the linear regression may predict one or more later points in time at which the UP of the file system may reach its projected value. For example, the later point in time may be 2 weeks later than the $12^{th}$ week of the series, which would be Week 14.

At step S406, the automated capacity risk analysis module 302 sets a threshold utilization percentage "T" that is indicative of a risk of reaching maximum capacity of the file system. In example embodiments, the threshold T is set via an administrator or other party. For example, the threshold T is 85% of the maximum capacity of the file system. However, the threshold T may be a different percentage. For example, the threshold T may be 70%, 75%, 80%, 90% or 95%. In example embodiments, a threshold T that is too low may unnecessarily require the updating of the file system, which may come at unnecessary additional cost and memory usage. For example, a threshold T that is 70% or less of the maximum capacity of the file system may come at unnecessary additional cost and memory usage. In example embodiments, at step S406, the automated capacity risk analysis module 302 also sets a designated number of time periods.

At step S408, the automated capacity risk analysis module 302 determines whether the future UP projected via the linear regression analysis performed at step S404 is equal to or greater than the threshold T. In example embodiments, if at step S408 the UP projected by the linear regression performed at step S404 is lower than the threshold T, then the automated capacity risk analysis module 302 returns to step S402 to continue to monitor the file system, for example to monitor the UP of the file system. However, if the projected UP is equal to or greater than the threshold T, then the automated capacity risk analysis module 302 continues to step S410.

In example embodiments, the automated capacity risk analysis module 302 continues to step S410 only when the projected UP is equal to or greater than the threshold T within the designated number of time periods set at step S406.

At step S410, the automated capacity risk analysis module 302 calculates a rate of change of the UP for each series of time intervals. In example embodiments, for each time interval within a given series, the automated capacity risk analysis module 302 determines the maximum UP during that time interval and sets that maximum UP as representative of the UP for that time interval. For example, during a 12-week series, the UP during Week 6 is the maximum UP of the file system during that week, even if at other times during that week, the UP is lower than the maximum UP. In example embodiments, based on the representative UP for each time interval within a given series, a rate of change of the UPs is calculated. In example embodiments, as the utilization of the file system may increase from time interval to time interval, the UP may grow from one time interval to another, and an overall slope of UP growth over that series can be derived, the slope representing the rate of change of the UP of the file system during that series of time intervals. For example, if the series is a series of 12 weeks, then the rate of change that is calculated at S410 as the slope of the 12 data points, each data points representing the maximum UP of the file system during that week.

Example case study: The UP of a series of 12 one-week time intervals is summarized in Table 1 below, where "TI" stands for Time Interval, each TI corresponding to one week, each subsequent column representing successive weeks for a total of 12 weeks, and the UP for each TI is the percentage of maximum memory usage of the file system during that TI.

TABLE 1

| | TI | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| UP (%) | 63.7 | 63.7 | 63.7 | 63.7 | 63.7 | 63.7 | 63.7 | 80.8 | 80.8 | 80.8 | 80.8 | 80.8 |

In example embodiments, the rate of change is calculated as indicated in equation (1) below:

$$\text{Rate of change} = \frac{\sum (x - \bar{x})(y - \bar{y})}{\sum (x - \bar{x})^2} \quad (1)$$

Where x is the TI, $\bar{x}$ is the average TI for the entire series, y is the UP and $\bar{y}$ is the average UP for the entire series.

Based on the example data above, the rate of change of the UP over the 12-week TI series is about 2.09%.

At step S412, the automated capacity risk analysis module 302 calculates the variation of the rates of change for all the series of time intervals. In particular, the variation of the rates of change measures the evolution of the rates of change from one series to another. In an example embodiment, the UPs of three (3) series of one-week time intervals are given in Table 2 below:

In example embodiments, the three (3) series of one-week time intervals illustrated in Table 2 above are offset with respect to each other by one or more weeks. For example, the first series extends over weeks 1 through 12, the second series starts five (5) weeks after the start of the first series and extends over weeks 6 through 17, and the third series starts one week after the start of the second series and extends over weeks 7 through 18. Accordingly, the offset between the first series and the second series is five (5) weeks, and the offset between the second series and the third series is one (1) week. For each TI within each of the series, the UP of the file system is the maximum UP determined for that TI. For example, the UP of Week 3 is listed as 63.7%, and 63.7% is the maximum UP of the file system during that entire third week.

In Table 2, according to an example embodiment, the rates of change of the UP in each of the series, calculated based on equation (1) above, are 2.09%, 1.20% and 0.66%, respectively. Accordingly, as the rate of change of the UP for each series is calculated, as discussed above with respect to S410, the automated capacity risk analysis module 302 further calculates a variation of the rates of change of the UP for all the series at step S412. In the example above, the variation of the three (3) rates of change for the series of time intervals discussed above, as also calculated according to equation (1) above, is −0.72%. This calculated variation, which can also be expressed in terms of slope of the evolution of the rates of change from one series of TI to another, is negative because the rates of change of the successive series are steadily decreasing, from 2.09% to 0.66%. The automated capacity risk analysis module 302 continues to step S414.

In example embodiments, at step S414, the automated capacity risk analysis module 302 determines a number of conditions, the satisfaction of any one or more of which may be sufficient to proceed to the next step S416. In example embodiments, a first condition is whether the variation, or slope, of the rates of change of all the series of time intervals determined at step S412 is either equal to zero or is positive, i.e., whether the rates of change of UP throughout all the

TABLE 2

| | TI | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| UP (%) | 63.7 | 63.7 | 63.7 | 63.7 | 63.7 | 63.7 | 63.7 | 80.8 | 80.8 | 80.8 | 80.8 | 80.8 |
| | TI | | | | | | | | | | | |
| | 6 | 7 | 8 | 9 | 10 | 11 | 12 | 13 | 14 | 15 | 16 | 17 |
| UP (%) | 63.7 | 63.7 | 80.8 | 80.8 | 80.8 | 80.8 | 80.8 | 80.8 | 80.8 | 80.8 | 80.8 | 80.8 |
| | TI | | | | | | | | | | | |
| | 7 | 8 | 9 | 10 | 11 | 12 | 13 | 14 | 15 | 16 | 17 | 18 |
| UP (%) | 63.7 | 80.8 | 80.8 | 80.8 | 80.8 | 80.8 | 80.8 | 80.8 | 80.8 | 80.8 | 80.8 | 80.8 | series remain steady or are increasing. In the example illustrated in Table 2 above, the slope of the rates of change is −0.72%, and is thus negative. Accordingly, based on the example illustrated in Table 2, the answer to the question posed at S414 is "NO," and the automated capacity risk analysis module 302 returns to step S402.

In example embodiments, another condition that the automated capacity risk analysis module 302 may determine is whether the UP for the last TI is equal to or greater than the threshold. In the example illustrated at Table 2 above, the UP for the last TI is 80.8%, and the threshold is 85%, so the UP of the last TI is not greater than the threshold and the answer to the question posed at S414 is also "NO." Accordingly, in the example illustrated in Table 2, the automated capacity risk analysis module 302 would also return to step S402. However, in example embodiments, if any, or both, of the above conditions are met, i.e., if the answer to either or both questions posed at S414 is "YES," then the automated capacity risk analysis module 302 continues to step S416.

In example embodiments, another condition that the automated capacity risk analysis module 302 may determine at step S414 is whether the projected UP for the second-to-last TI is greater than the measured UP for that same second-to-last time interval. In example embodiments, if the above condition is satisfied, then the automated capacity risk analysis module 302 also continues to step S416.

In example embodiments, if any, or any combination, of the above conditions are met, then the automated capacity risk analysis module 302 continues to step S416.

At step S416, the automated capacity risk analysis module 302 designates, or flags, the file system as being at risk of reaching maximum capacity. Specifically, based on any combination of the conditions discussed at S414 being met, the automated capacity risk analysis module 302 determines that the file system is at risk of reaching maximum capacity. In example embodiments, although any one of the conditions discussed at S414 can trigger a determination to flag the file system as being at risk of reaching maximum capacity, a combination of more than one of the conditions discussed at S414 can also trigger such a determination. For example, the automated capacity risk analysis module 302 may determine whether to flag the file system when any one of the conditions discussed at S414 are met, or when all of the conditions discussed at S414 are met.

In example embodiments, when the automated capacity risk analysis module 302 flags the file system as being at risk of reaching maximum capacity, the automated capacity risk analysis module 302 outputs a report identifying the flagged file system. In example embodiments, the report may be outputted to the administrator of the file system. In example embodiments, the automated capacity risk analysis module 302 also automatically mitigates the risk of reaching capacity of the file system. In example embodiments, the automated capacity risk analysis module 302 implements a mitigation protocol to mitigate the risk by, for example, increasing the amount of data storage allocated to the flagged file system.

Figure 5:
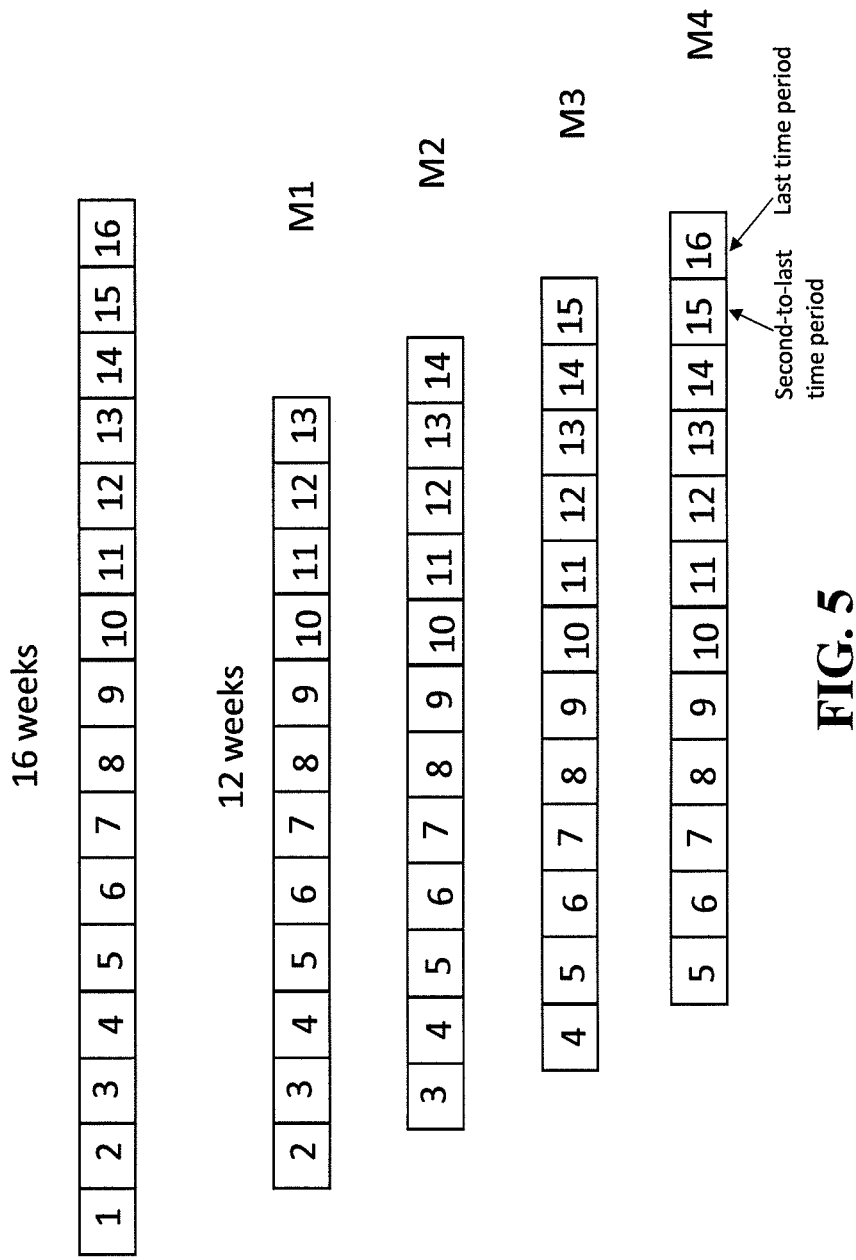
FIG. 5 is a diagram illustrating automated file system capacity risk analysis, according to an example embodiment.

FIG. 5 is a diagram illustrating a process for automated file system capacity risk analysis, according to an example embodiment. In the example embodiment illustrated in FIG. 5, all of the series of time intervals, illustrated in the figure as being four (4) series, extend over 16 weeks, and each of the series include 12 TIs, each TI being one week. In the example illustrated in FIG. 5, the series are offset with respect to each other by one week, unlike in the example illustrated at Table 2 above. Accordingly, in FIG. 5, the first series includes 12 consecutive weeks from week 2 to week 13, the second series includes 12 consecutive weeks from week 3 to week 14, the third series includes 12 consecutive weeks from week 4 to week 15, and the fourth series includes 12 consecutive weeks from week 5 to week 16. In example embodiments, the rates of change of the UP of the file system, e.g., as calculated at step S410 in FIG. 4, are calculated as M1, M2, M3 and M4, respectively, for each of the four (4) series. With reference to the example illustrated in Table 2 above which does not include a fourth series, M1, M2 and M3 would be equal to 2.09%, 1.20% and 0.66%, respectively. In example embodiments, the variation of the rates of changes calculated at step S412 is the slope of the number M1, M2, M3 and M4. In example embodiments, the last TI is week 16 of the fourth series, and the second-to-last TI is week 15 of the fourth series.

Example embodiments of the invention improve the technology of file system capacity management. Embodiments of the invention employ an unconventional arrangement of steps including: obtaining first utilization data of the file system during a plurality of series of time intervals; projecting a future utilization value for at least one of the plurality of series of time intervals by performing a linear regression on the first utilization data; setting a threshold utilization percentage indicative of a risk of reaching maximum capacity of the file system; and determining whether the projected future utilization value is equal to or greater than the threshold utilization percentage. In example embodiment, in response to the projected future utilization value being equal to or greater than the threshold utilization percentage, the method further includes calculating a rate of change of the first utilization data for each of the series of time intervals; determining a variation of the rates of change of all the series of time intervals; and in response to the variation of the rates of change of all the series of time intervals being positive or the first utilization data for the last time interval being equal to or greater than the threshold, designating the file system as being at risk of reaching maximum capacity. The combination of the steps is unconventional. For example, the steps of calculating a rate of change of the first utilization data and determining a variation of the rates of change of all the series of time intervals are unconventional. Accordingly, with this technology, it is not only possible to accurately predict when a file system is likely to reach maximum capacity, but the number of file systems that are erroneously designated as being at risk of reaching maximum capacity is also reduced compared to merely performing a linear regression analysis of the projected UP of the file system.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular processes, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory (RAM) or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in example embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of the entirety of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing automated file system capacity risk analysis, the method being implemented by a processor on a computing device, the method comprising:
    obtaining, by the processor, first utilization data of a file system during each of a plurality of series of time intervals, the plurality of series of time intervals including a last series of time intervals, the last series of time intervals including a last time interval and a second-to-last time interval;
    projecting, by the processor, a future utilization value for at least one of the plurality of series of time intervals by performing a linear regression on the corresponding first utilization data;
    setting, by the processor, a threshold utilization percentage indicative of a risk of reaching maximum capacity of the file system; and
    determining, by the processor, whether the projected future utilization value is equal to or greater than the threshold utilization percentage;
    wherein, in response to the projected future utilization value being equal to or greater than the threshold utilization percentage, the method further comprises:
    calculating, by the processor, a rate of change of the first utilization data for each of the series of time intervals;
    determining, by the processor, a variation of the rates of change of the plurality of series of time intervals; and
    in response to at least one of:
        the variation of the rates of change of the plurality of series of time intervals being positive; and
        a first utilization data for the last time interval being equal to or greater than the threshold utilization percentage:
            designating, by the processor, the file system as being at risk of reaching the maximum capacity.

2. The method of claim 1, further comprising setting, by the processor, a designated number of time periods,
wherein the file system is designated as being at risk of reaching the maximum capacity in response to the projected future utilization value being equal to or greater than the threshold utilization percentage within the designated number of time periods.

3. The method of claim 1, further comprising determining a projected future utilization value for the second-to-last time interval; and
designating the file system as being at risk of reaching maximum capacity in response to the projected utilization value for the second-to-last time interval being greater than a first utilization data for the second-to-last time interval.

4. The method of claim 1, wherein the first utilization data of the file system during each of the plurality of series of time intervals comprises a utilization percentage of a memory of the file system.

5. The method of claim 4, wherein the utilization percentage of the memory of the file system for a particular time interval is a maximum utilization percentage of the memory of the file system during the particular time interval.

6. The method of claim 1, wherein at least two consecutive ones of the plurality of series of time intervals are offset with respect to each other by a time interval.

7. The method of claim 1, wherein at least two consecutive ones of the plurality of series of time intervals are offset with respect to each other by more than a time interval.

8. The method of claim 1, wherein, for each of the plurality of series of time intervals, the projecting the future utilization value comprises projecting the corresponding future utilization value at one or more time intervals subsequent to the series.

9. The method of claim 1, wherein the time intervals within each of the plurality of series of time intervals are ranked successively.

10. The method of claim 1, wherein one or more of the series of time intervals comprises 12 time intervals.

11. The method of claim 10, wherein one or more of the 12 time intervals are one-week time intervals.

12. The method of claim 1, wherein the threshold utilization percentage is 70% of the maximum capacity of the file system.

13. A computing device configured to implement an execution of a method for automated file system capacity risk analysis, the computing device comprising:
a display screen;
a processor;
a memory; and
a communication interface coupled to each of the processor, the memory, and the display screen,
wherein, when the method is executed, the processor is configured to:
obtain first utilization data of a file system during each of a plurality of series of time intervals, the plurality of series of time intervals including a last series of time intervals, the last series of time intervals including a last time interval and a second-to-last time interval;
project a future utilization value for at least one of the plurality of series of time intervals by performing a linear regression on the corresponding first utilization data;
set a threshold utilization percentage indicative of a risk of reaching maximum capacity of the file system; and
determine whether the projected future utilization value is equal to or greater than the threshold utilization percentage;
wherein, in response to the projected future utilization value being equal to or greater than the threshold utilization percentage, the processor is further configured to:
calculate a rate of change of the first utilization data for each of the series of time intervals;
determine a variation of the rates of change of all the series of time intervals; and in response to at least one of:
the variation of the rates of change of all the series of time intervals being positive; and
a first utilization data for the last time interval being equal to or greater than the threshold utilization percentage:
designate the file system as being at risk of reaching maximum capacity.

14. The computing device of claim 13, wherein the processor is further configured to set a designated number of time periods;
wherein the file system is designated as being at risk of reaching maximum capacity in response to the projected future utilization value being equal to or greater than the threshold utilization percentage within the designated number of time periods.

15. The computing device of claim 13, wherein the processor is further configured to:
determine a projected future utilization value for the second-to-last time interval; and
in response to the projected utilization value for the second-to-last time interval being greater than a first utilization data for the second-to-last time interval, designate the file system as being at risk of reaching maximum capacity.

16. The computing device of claim 13, wherein consecutive ones of the plurality of series of time intervals are offset with respect to each other by a time interval.

17. The computing device of claim 13, wherein consecutive ones of the plurality of series of time intervals are offset with respect to each other by more than a time interval.

18. The computing device of claim 13, wherein:
a series of time intervals comprises 12 time intervals; and
each of the 12 time intervals is a one week time interval.

19. The computing device of claim 13, wherein the threshold utilization percentage is 70% of the maximum capacity of the file system.

20. The computing device of claim 13, wherein a utilization percentage of a memory of the file system for a particular time interval is a maximum utilization percentage of the memory of the file system during the particular time interval.

* * * * *